United States Patent [19]

Nyman et al.

[11] Patent Number: 4,628,391
[45] Date of Patent: Dec. 9, 1986

[54] METHOD FOR DISPERSING TWO PHASES IN LIQUID-LIQUID EXTRACTION

[75] Inventors: Bror G. Nyman, Vanha-Ulvila; Stig-Erik Hultholm, Pori; Launo L. Lilja, Pori; Valto J. Mäkitalo, Pori, all of Finland

[73] Assignee: Outokumpu Oy, Helsinki, Finland

[21] Appl. No.: 609,737

[22] Filed: May 14, 1984

[30] Foreign Application Priority Data

May 12, 1983 [FI] Finland ................... 831657

[51] Int. Cl.$^4$ ............................ B01F 3/08; B01F 5/10
[52] U.S. Cl. .................................... 366/265; 366/348
[58] Field of Search ............... 366/262, 263, 264, 265, 366/270, 348; 422/227, 259

[56] References Cited

U.S. PATENT DOCUMENTS

| | | | |
|---|---|---|---|
| 994,679 | 6/1911 | Hills | 366/262 X |
| 1,080,177 | 12/1913 | Still | 366/265 |
| 1,646,913 | 10/1927 | Jost | 366/270 |
| 2,460,987 | 2/1949 | Kanhofer | 422/227 X |
| 3,173,763 | 3/1965 | Miller et al. | 422/227 |
| 3,615,243 | 10/1971 | Scott | 366/262 X |
| 3,973,759 | 8/1976 | Mizrahi et al. | 366/264 |

Primary Examiner—Philip R. Coe
Attorney, Agent, or Firm—Brooks Haidt Haffner & Delahunty

[57] ABSTRACT

The present invention concerns a way to achieve in liquid-liquid extraction in the step of dispersing two different solution phases the transformation of the desired phase, which may also be the phase with smaller volume, to become the continuous phase, with the aid of a primarily vertical circulation flow. The invention also concerns an apparatus serving this purpose, a circulation dispersion contactor, in which the smooth circulation of the dispersion is accomplished by the aid of a radial pump turbine designed for this particular purpose, or of an axial propeller, and of distribution/guide rings on the periphery of the contactor.

3 Claims, 8 Drawing Figures

METHOD FOR DISPERSING TWO PHASES IN LIQUID-LIQUID EXTRACTION

The object of the way of the invention is, in the dispersing step of two different phases in liquid-liquid extraction, by the aid of a vertical circulation flow to achieve the formation of the desired phase, even that with smaller volume, to become a continuous phase with the second phase being dispersed therein. The invention also concerns an apparatus for accomplishing said way.

Liquid-liquid extraction is a unit process, in which material transfer takes place between the liquid phases when they are mutually dispersed. One of the phases is usually an aqueous solution containing the components to be separated, and the other phase as a rule consists of an organic solvent with scanty water solubility, and often also of an organic extractant solved therein. The density of the aqueous phase is usually higher than that of the organic phase, with the exception of those instances in which for the solvent of the organic phase has been used a chlorinated hydrocarbon increasing the density.

In order to achieve good matter transfer from the aqueous to the organic phase, it is of primary importance to bring the phases into good contact with each other. This takes place in the mixer or contactor section of the extraction apparatus. Subsequent to expedient mixing contact, the dispersion is conducted in mixer-settler type extraction apparatus to a tranquilized settling zone, where the solution phases are separated into two layers by gravity effect. In most separation processes, the liquid phases are mixed and separated in several steps in order to achieve a high enough, and selective, matter transfer. The number of separation steps varies, depending on the process, from a few to tens of phases.

As a liquid-liquid extraction apparatus, the mixer-settler has become highly popular particularly in metallurgic industry, owing to the relatively simple, and reliable, principle of operation of this apparatus type.

In a design of prior art, in which the mixer is provided with a pumping turbine mixer, initially developed for processing nuclear fuel, the solution is drawn up into the hollow turbine shaft and is flung out between the vanes of the turbine mixer mounted thereon (B. V. Coplan, J. K. Davision and E. L. Zebroski, Chem. Eng. Progr. Vol. 50 No. 8 p. 403 (1954)).

In one apparatus, the mixer is a flat-bottomed container with a turbine fitted to it (D. W. Agers and E. R. Dement, Proceedings International Symposium "Solvent Extraction in Metallurgical Processes" p. 27 Technologisch Institut K. VIV, Antwerpen 1972). The turbine mounted over the common inlet port of the light and heavy phases has the structure of a horizontal plate provided with vanes on the underside. The turbine pumps the dispersion through an outlet port in the upper part of the mixer along an expanding chute directly into a clarifier.

An extraction apparatus of pump mixer-settler type is also known in the art in which the cross section of the mixer is square and in which both the light and the heavy phase is conducted into the mixer through an intake cylinder provided on its bottom (G. C. Warwick, J. B. Scuffham and J. B. Lott, Proceedigns International Solvent Extraction Conference ISEC'71, Vol. 2, p. 1373, Society of Chemical Industry, London, 1971). The vanes of the turbine are on top covered by a smooth round plate and on the underside by a smooth round ring, the opening of which is above the opening of the intake cylinder. The height of the intake cylinder is so dimensioned that the turbine may be disposed in the middle of the mixer. The dispersion sinks out through an opening in the horizontal intermediate bottom encircling the turbine shaft, said intermediate botom confining the mixing space upward, and whereafter the dispersion flows in an undivided flow over this partition directly down into the settler, and substantially on the same level as the dispersion band in the settler, the flow of the dispersion being controlled by one vertical and one horizontal baffle.

In the prior art there is also known an extraction means of the pump mixer-settler type in which two separate turbines are disposed on one shaft (T. K. Mattila, proceedings Solvent Extraction Conference ISEC'74 Vol. 1, p. 169, Society of Chemical Industry, London 1974). The upper turbine improves the mixing action of the pump turbine disposed close to the bottom of the mixer above the entrance point of the lower, heavy phase and furnishes a pressure of pulse for carrying the dispersion from the mixer to the settler. By the aid of the "stopping-starting" system included in this apparatus design, it is ascertained that when the pump turbine starts the heavier phase is present, dispersed into drops. Phase-inversion, that is a change of the dispersion type, is prevented by returning extraction solution into the mixer from the settler of the same phase, either in free flow or using a pump turbine.

In one type of extraction apparatus (J. Mizrahi and D. Meyer, Proceedings International Solvent Extraction Conference ISEC'74, Vol. 1, p. 141, Society of Chemical Industry, London, 1974), turbines mounted on separate concentric shafts are used for mixing and pumping, whereby these actions can be regulated independently. The pump turbine is disposed in an ascending cylinder, which is above the mixer turbine. Both the mixer and the settler are cylindrical. The phases entering the mixer are conducted towards the bottom of the mixer, while the dispersion from the mixer is conducted directly to the middle of the settler.

The extraction apparatus of the Finnish Pat. No. 57059 comprises a mixer-settler provided with a presettler. Said presettler arrangement improves the ability of the means to separate the liquid phases as well as possible, at the same time promoting the matter transfer of each phase. The mixer of the apparatus has a large pumping radial turbine in the centre. By increasing the size of the mixing member, the requisite mixing effect is attained without incurring an unfavourably high peripheral velocity of the turbine, and as a result the droplet size of the dispersions can be kept reasonable.

Studies that have been carried out show that the substantially conventional dispersion designs presented in the foregoing can only be used with great restrictions if the mixing of liquid phases with great emulsifying tendency is concerned, or the mixing of large liquid volumes. When liquid phases are dispersed, the first limiting factor encountered is the emulsifying tendency of the liquid phases. Endeavours are, in dimensioning a mixer for use in dispersing, to use peripheral velocities less than 10 m/s, preferably less than 6 m/s, in order to prevent the wear of the mixer, but even these peripheral velocities give rise in many phase systems to such small droplets that a permanent emulsion is formed. Emulsification is furthered by foreign substances in the liquid phases, whereby they lower the phase boundary tension, thereby causing the droplet size to diminish and the dispersed proportion of the drop phase to decrease. Phases with emulsifying tendency are difficult to disperse, in small apparatus already, with conventional mixing methods. In adverse instances, the ordinary mixer-settler cannot be used at all as extraction means.

The risk of emulsification is reduced both by chemical and apparatus technology expedients. It is possible to the extraction solution phase to add, beside the extracting agent and its diluent, also a third component improving the separation of the phases. Frequently, the extracting agent concentration is also lowered at the same time in order to reduce the viscosity of the extracting solution, and this is done at the cost of capacity. To prevent emulsification, attention is increasingly paid to the shape of the radial turbine, particularly when constructing large apparatus units. The vanes of the turbine have been shaped to be backward curved with reference to the direction of rotation, at the same time increasing the number of vanes with the purpose of reducing the local shearing forces.

As taught by the design conventional in the art, the mixer dispersing liquid phases has been dimensioned according to the same principles as mixer reactors in general. For mixers, thus a radial turbine has been used the diameter of which is ⅓ of the diameter of the mixer tank. In smaller apparatus in particular, this dimensioning principle has been successful although the special features related to dispersing have not been taken into account.

When the size of the extraction means becomes great, for instance 10 to 50 l m³ mixer volume, the dispersion of the phases becomes problematic. The local mixing intensity cannot be increased as much as the mixing of the entire mixer space would require. The peripheral velocity of the radial turbine commonly employed for dispersing inevitably increases which increasing apparatus size when the aim is equal average mixing intensity as in smaller mixers. As the peripheral velocity of the vanes on the radial turbine increases, smaller droplet size in the dispersion is incurred at the same time. The decrease of droplet size is nearly always disadvantageous because in rear instances only decrease of droplet size results in improved matter transfer between the phases. In a conventional mixer-settler, relatively vigorous mixing is required, in the first place in order to keep the liquid phases in dispersion also outside the actual mixing zone, such as in the peripheral region of the mixer and in its upper part.

The procedural and apparatus designs, primarily conventional, which have been presented afford no chance to directly control the dispersion type; that is, when using these means one cannot freely choose which one of the liquid phases shall be dispersed to drops and which of the phases acts as a continuous phase. Many types of apparatus preferentially disperse the extracting solution. This is particularly true for certain pump mixer designs in which the radial turbine mixing the liquid phases has been placed in the bottom part of the mixer immediately adajcent to the entering duct in order to produce a pumping effect. Since the mixing member is located in the bottom part of the mixer, it is as it starts up surrounded by the heavier phase, and by mediation of the motion of this heavier phase, the lighter liquid phase thereabove is dispersed into a droplet phase. In order that the heavier liquid phase might be dispersible into a droplet phase with this apparatus, the mixer must at start-up of the turbine be filled with ligh-ter phase, and an adequate excess of the light phase has to be maintained during the run in order to prevent phase inversion.

As the apparatus size increases, phase inversion is usually induced by incomplete mixing. Hereby, the light phase is classified owing to buoyancy effect to go to the upper part of the mixer, and it departs prematurely from the mixer, particularly if the dispersion exit duct is located in the upper part of the mixer. Therefore the proportion of the light phase in the dispersion is not consistent with the input proportion and is instead considerably lowered. Together with the change of phase proportion, maintaining the light phase continuous becomes increasingly difficult and will become impossible in the course of time.

It would in most instances be to advantage to keep the light phase continuous, because in that case the extracting solution wets all the surfaces of the mixer and prevents the formation of inorganic salts such as gypsum. The ratio between the volume of the light phase, i.e., usually the organic phase, and that of the water phase is in extraction mostly $Vo/Vaq \leqq 1$, and if the light phase is kept continuous, the water phase is in droplets, and since the volume of the water phase is larger, a compact drop grouping is obtained, whereby as a result clear solutions will be separated in the settler. In the full scale apparatus of existing art, it has not been possible to maintain the light phase continous, and the phase-specific matter transfer has also remained relatively poor because of incomplete mixing, since the r.p.m. of the mixer, and therefore also the peripheral velocity, could not be increased without objectionably decreasing the droplet size of the dispersion. In an extraction apparatus introduced in recent years, the mixer has been divided into three sections mixed separately each. This in part illustrates the mixing problem of extraction apparatus of large size which exists in liquid-liquid extraction.

The present invention concerns a way of dispersing the two different liquid phases in liquid-liquid extraction with each other by a primarily vertical circulation flow principle, and an apparatus for accomplishing said dispersing process. By the aid of the new way of dispersing now developed the above-mentioned problems related to dispersing liquid phases can often be successfully solved, such as emulsification, the small droplet size caused by high peripheral velocity of the mixer in a large extraction apparatus. The state of dispersion is maintained by circulating the greater part of the dispersion in a mixer, or dispersion contactor, in closed, substantially vertical circulation within a contactor according to the invention. The circulation flow is obtained by using a pump turbine specifically developed to serve the purpose, which has a good pumping characteristic, or possibly an axial pumping member. Depending on the size and shape of the apparatus, the dispersion quantity corresponding to the volume of the contactor circulates through the pump turbine in 0.1 to 2 minutes, and the circulation extends then outside the mixing zone produced by the pumping member. It is advantageous to use the shortest possible circulation period whereby the dispersion type is better under control and the matter transfer is accelerated. The circulation period should be clearly shorter than that separation time in which the liquid phases in the dispersing space would be separated into two layers if the circulation were stopped. The mixing section of the extraction means of the invention is according to its operation called a circulation dispersion contactor, of which also the name CDF contactor is used, referring to the circulating dispersion flow characteristic of the means.

The invention is described more in detail by the aid of the figures attached, wherein.

Figure 1:
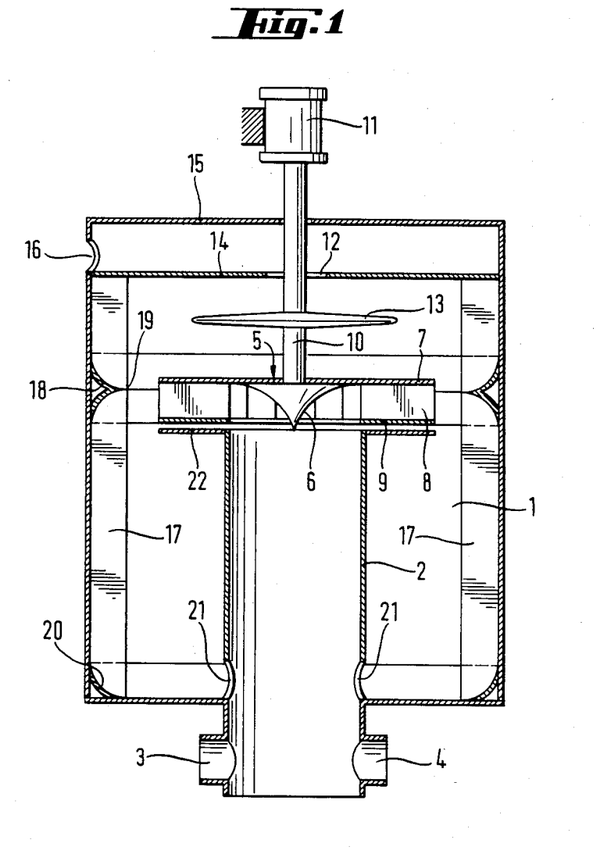
FIG. 1 is a vertical section of a CDF contactor of the invention, dispersing the heavy phase.

In FIG. 1, which depicts a contactor dispersing the heavy phase, the light, or organic, phase being continuous, the phases flow into the contactor 1 through the apertures located in the lower part of the intake cylinder 2, through the entrance aperture 3 of the heavy phase and the entrance aperture 4 of the light phase, drawn in by the pump turbine 5. The pump turbine 5 consists advantageously of an intake guide 6, an upper disk 7, vanes 8 and a lower annular plate 9. The pump turbine 5 is mounted in the upper part of the contactor 1 on a short shaft 10. The diameter of the pump turbine 5 is usually between 0.4 and 0.8 times the diameter of the contactor, preferably 0.65 times the diameter of the contactor. The shaft 10 is rotated by a motor 11, and in the upper space of the means, below the exit aperture 12 of the dispersion, is mounted a shut-off disk 13 on the shaft 10, this disk as it rotates contributing to uniform distribution of the shaft power over the entire contactor filling. The shut-off disk 13, which is parabolically shaped, prevents the phases from being classified in the upper space of the contactor, and thereby it prevents the light phase from being removed faster from the contactor. The shut-off disk 13 equalizes, all around the contactor cross section, the dispersion flow pushing to the baffle plate 14 through the exit aperture 12. From the baffle plate 14, the dispersin flow continues through the exit aperture 16 under the contactor cover 15 to the separating section of the extraction means, which advantageously is an extraction means with presettler as disclosed in the Finnish Pat. No. 57059.

The contactor has advantageously cylindrical shape, and in order to promote the dispersing it is provided with for instance four vertical vortex inhibiting plates 17, these plates being positioned at equal spacing on the periphery of the contactor 1 and having a breadth about 1/10 of the contactor diameter. Roughly on the level of the turbine 5, a guiding distributor ring 18 is placed on the periphery of the contactor 1 to distribute the turbine jet and to turn most of it downwards. Of the height of the dispersing passages defined between the vanes 9 of the turbine, advantageously 1/10 to ⅓ lies above the distributing edge 19 of the distributor ring 18. The curved surfaces of the distributor ring 18 have suitably a cross section which is a circular or parabolic arc, and the distributing edge 19 of the ring extends inwards to a distance from the contactor wall which is about 1/10 to ⅓ times the diameter of the contactor. On the bottom of the contactor, on its periphery, is provided a guide ring 20, its curved surface likewise preferably a parabolic or circular arc in its vertical cross-section. The surface of the guide ring 20 guiding the flow extends to the same distance inwards from the contactor wall as the distribution edge 19 of the guiding distributor ring higher up. For the circulating flow, the intake cylinder 2 is provided with adjustable apertures 21 placed in the immediate adjacency of the contactor bottom. The number of the apertures may vary, as required; for instance, 2 to 4 apertures are most often an adequate number for achieving low circulation resistance. At the top end of the intake cylinder 2 is placed a horizontal annular plate 22. The inner diameter of the annular plate 22 is the same as the inner diameter of the intake cylinder 2, and the outer diameter of the plate is preferably 0.2 to 1.0 times the diameter of the pump turbine 5.

Figure 2:
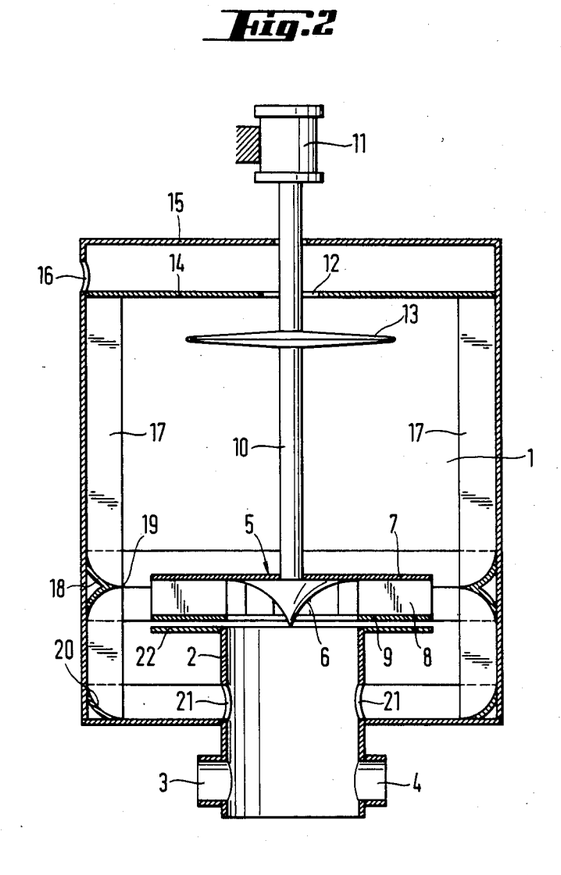
FIG. 2 is a vertical section of a CDF contactor, in which the light phase is dispersed.

FIG. 2 depicts a contactor dispersing the light phase, and it is similar in construction to the contactor of FIG. 1, but in the present instance the pump turbine 5 is placed in the lower part of the contactor 1, as is also the guiding distributor ring 18 extending inwards from the periphery of the contactor. Of the height of the dispersion passages defined between the turbine vanes 8, preferably 1/10 to ⅓ lies in this instance lower than the distributing edge of the distributor ring 18, whereby most of the dispersion jet from the turbine turns upward.

Figure 3:
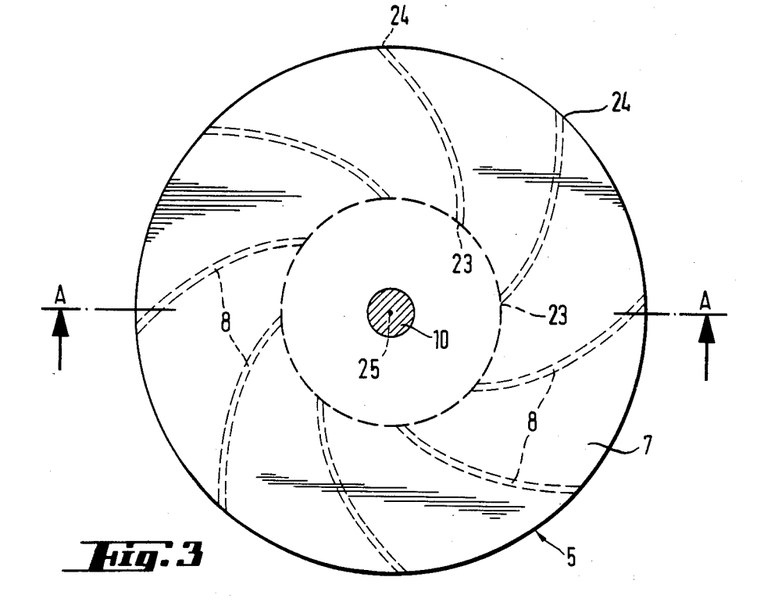
FIG. 3 presents in top view an alternative of the pumping means used in the contactor.
Figure 4:
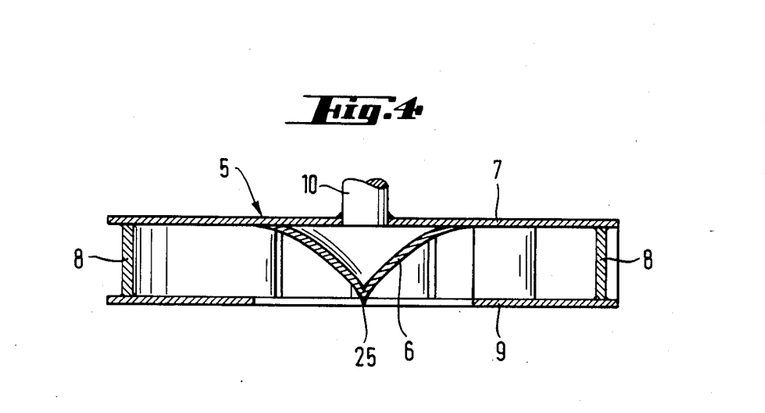
FIG. 4 is the section A—A of the radial turbine of FIG. 3.

In FIGS. 3 and 4 has been depicted in greater detail a pumping member well suited for the contactor of the invention, namely, a radial pump turbine. The turbine vanes 8 are placed between the peripheral part of the circular plate 7 confining the turbine upwards and the annular plate 9. As the name implies, the annular plate is shaped like a ring, and it extends from the root 23 of the vanes to their tips 24. The inner diameter of the annular plate is about 1.0 to 1.3 times the inner diameter of the intake cylinder 2. The inner diameter of the intake cylinder, again, is advantageously 0.3 to 0.8 times the diameter of the pump turbine 5. The mixing vanes 8 of the turbine are in shape advantageously circular arcs, the root part 23 of which is directed at 45° angle against the radius drawn from the centre of the pump turbine to the starting point of the root, and the approach of their tips 24 to the periphery being under 50° with reference to the corresponding radius drawn through the entering point. On the underside of the top plate 7 of the turbine is attached in the central part of the plate an entrance guide 6 guiding the flow of the liquid phases. The diameter of the guide 6 is the same as the inner diameter of the annular plate 9. The tip 25 of the guide 6 extends advantageously in the horizontal plane to the same level as the annular plate 9. In lateral projection, the flow guiding surfaces of the guide 6 are either circular or parabolic arcs.

Figure 5:
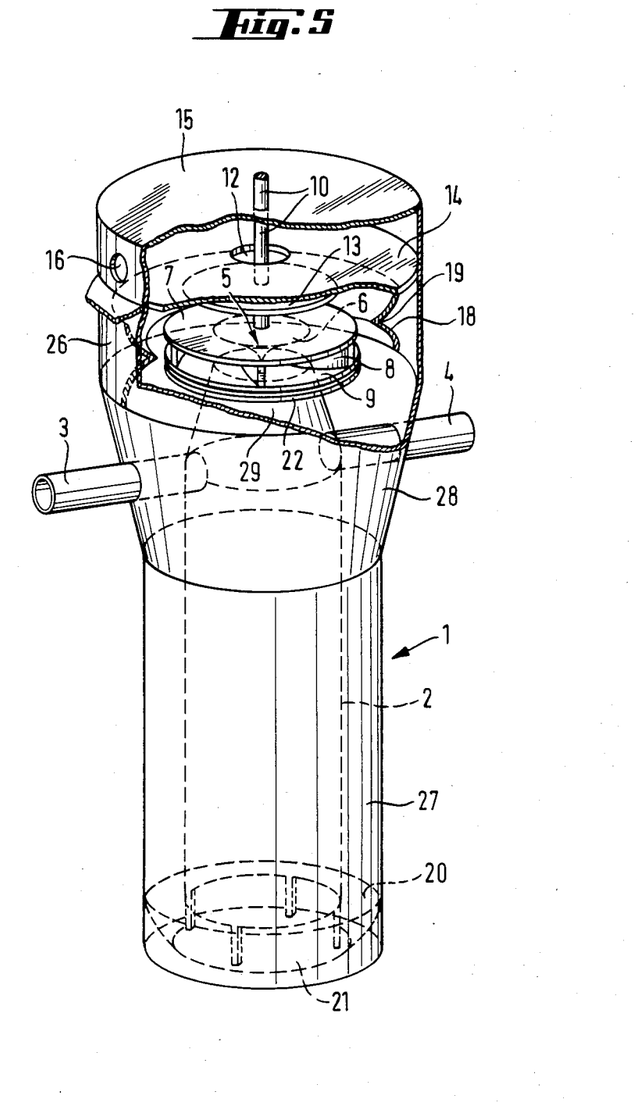
FIG. 5 is a view in oblique axonometric projection, partly sectioned, projection of a CDF contactor of the invention dispersing the heavy phase.

In FIG. 5, an advantageous embodiment of the present invention is depicted in oblique axonometric projection, partly sectioned. The upper part 26 of the contactor is almost similar to the contactor presented in FIG. 1, but the lower part 27 of the contactor consists of a cylinder connected to the top part by means of an extension part 28. The vortices in the flow maintain the dispersed state in the lower part 27 of the contactor, and the dispersion apertures 21 enabling the circulation flow are regulated to be large enough so that they do not significantly throttle the flow. The upper part 29 of the intake cylinder 2 has in this apparatus design been made narrower, and the feed pipes 3 and 4 of the solution phases have been connected to this upper part 29.

Figure 6:
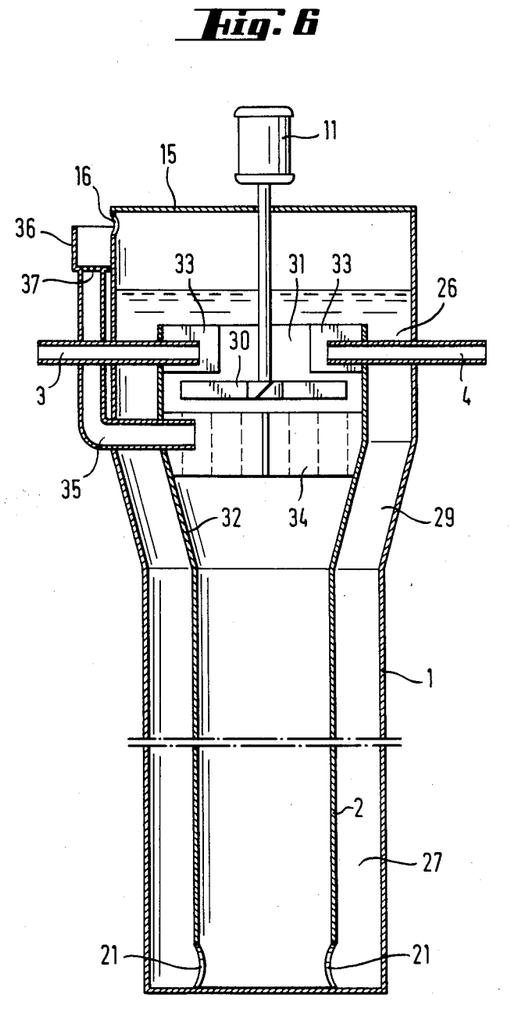
FIG. 6 is a vertical section of another embodiment of the CDF contactor.

In FIG. 6, yet another embodiment of the CCF contactor is presented. In this embodiment, the contactor 1 is provided with a heavy axial pumping element, for instance a propeller 30, placed in the upper part 31 of the circulation tube 2 corresponding to the intake cylinder. The circulation tube 2 may comprise a constricted part 32 below the pumping member, but when liquids less likely to be emulsified are handled this is not necessary. Above the pumping member 30, vortex inhibiting plates 33 are placed, and under the pumping member efficient flow grids 34 preventing rotation of the flow. The circulation flow directed downwards in the circulation tube 2 flows through the dispersion apertures into the lower part 27, rising upwards from there. In this application, the dispersion apertures extend almost throughout the whole periphery, whereby the unnecessary flow resistance at the turning point of the dispersion can be prevented. The contactor 1 may be cylindrical, or it may be composed as the contactor presented in FIG. 5. The dispersion flow that has ascended into the upper part 26 of the contactor is again directed to the mouth of the circulation tube 2, thanks to the suction acting here, and it continues onto the next cycle. The feed pipes 3 and 4 of the heavy and light phases in this embodiment the upper part 31 of the circulation tube. Part of the dispersion is removed from the contactor circulation by a discharge pipe 35 on the pressure side of the pumping member 30 to a distribution box 36. In this case, the dispersion does not discharge through the exit port 16; instead, the exit port 16 is now used to maintain the pressure of the gas volume of the contactor at the exterior atmospheric pressure.

Figure 7:
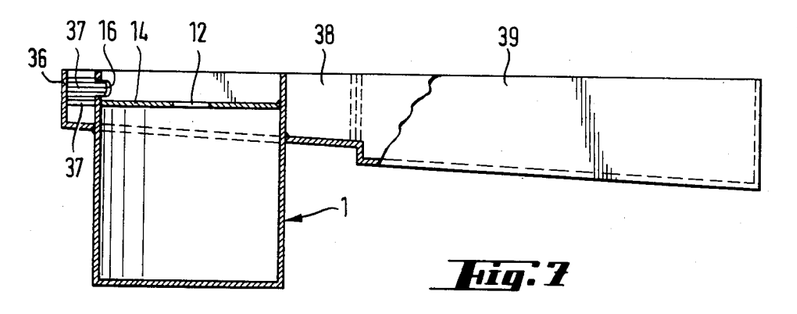
FIG. 7 illustrates the placement of the CDF contactor in the extraction cell of the Finnish Pat. No. 57059.
Figure 8:
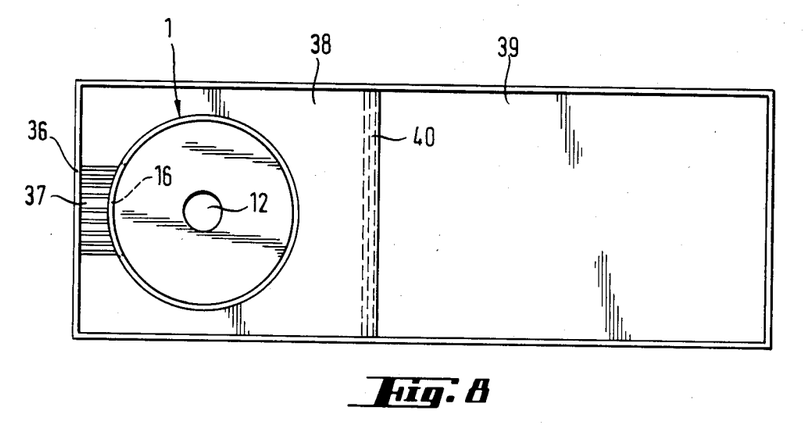
FIG. 8 shows the same, viewed from above.

FIGS. 7 and 8 illustrate the connecting of a contactor according to our invention to an extraction cell, advantageously specifically to a cell with praesettler as disclosed by the Finnish Pat. No. 57059, in which case the contactors are surrounded by the presettler. The dispersion discharging from the exit port 16 of the contactor 1 flows to a distribution box 36, and from the bottom slits 37 of this box the dispersion proceeds towards the bottom of the presettler 38. The entry of the dispersion in the presettler 38 has been damped by positioning the bottom of the distribution box 36 immediately below the level of the presettler dispersion, and the overflow threshold of the exit aperture 16 is slightly above the dispersion level. The dispersion separating into separate phases one over the other proceeds around the contactor in two partial flows, which combine at the slotted plates 40 in front of the settler 39.

As was apparent from the description of FIGS. 1 and 2, the contactor of our invention may, by making a few changes, be made into a contactor able to disperse either the light or the heavy phase. The dispersion of the heavy phase is thus based on the dispersion circulation produced by a pump turbine above the intake cylinder and placed in the upper part of the contactor. The dispersion circulation is maintained in that the main part of the dispersion flow discharging from the pump turbine to one side in the horizontal plane is smoothly turned downwards by the aid of a guiding vane ring. Hereby, the flow is directed towards the bottom in the annular space defined by the intake cylinder and the contactor walls. Close to the bottom level of the contactor, the direction of the flow is reversed, and it is conducted to the intake cylinder, where the dispersion flow and the fresh phases that have come from below ascend upwards, owing to the suction effect of the pump turbine. At the intake aperture of the turbine, the flow direction once again becomes horizontal. For uniform distribution of the flow across the entire cross section, an entrance guide for the flow is placed in the central part of the turbine.

When the turbine is started in a contactor as in FIG. 1, it starts to rotate in the light phase separated in the top part of the contactor. The moving of the light phase causes the dispersion of the heavy phase into droplets. Owing to the circulation flow, it is easy to maintain the produced dispersion type, in which the light phase is the continuous phase. In the contactor of the invention, the light phase is not classified into its upper part when the means is in operation, and therefore it will not pass through the mixer prematurely nor cause any phase inversion. The direction in which the dispersion jet from the turbine turns is controlled regulated by the aid of a guiding distributor ring placed on the periphery of the contactor. When dispersing the heavy phase, only a small part of the turbine jet is guided upwards. By the aid of a shut-off disk placed on the same shaft as the turbine, preferably parabolic in shape, the proportion of the jet turning upward may be further reduced, because when rotating, the shut-off disk improves the moving about of the dispersion in the upper part of the contactor.

Utilization of a smoothly proceeding dispersion circulation flow is a characteristic feature in the way of the invention to accommodate two liquid phases in the dispersion space. By the shaping of the pump turbine and the contactor and by regulating the apertures of the intake cylinder, a flow intensity advantageous with a view to dispersion can be found by trial in each case. The dispersion is not substantially dependent on the primary vortices caused by the mixer itself, but rather on the secondary vortices occurring outside the mixing range proper, which display more uniform shearing forces, and for this reason is it possible to shape the turbine for smooth flow and to avoid the arising of high shearing forces. Owing to the high pumping capacity of the pump turbine used in the contactor, an adequate circulation flow is achieved with reduced r.p.m., whereby dispersing the liquid phases thus succeeds with a turbine of which the peripheral velocity has been lowered from the level which a conventional mixing turbine requires. As a consequence, the droplet size of the dispersion grows while at the same time the proportion of small drops diminishes. This in turn improves the phase separation in the settler, and it is in particular possible in this way to achieve clear phases.

The new dispersing method utilizes a circulation flow affords the possibility to select the heavy phase, that is, as a rule the aqueous phase, to be the drop phase also when the proportion of the volumes of the organic phase and the aqueous phase is $V_o/V_{aq} \leq 1$ or $V_o/V_{aq} \leq \leq 1$. Maintaining the organic phase as a continuous phase contributes to higher ultimate degree of separation of the phases, because the compact grouping of the dispersion droplets attenuates the ascending and descending flows impairing the final separation.

When the light phase, or usually the extraction solution phase, is desired to be the droplet phase, this is achieved by an arrangement as in FIG. 2. In this alternative, a remarkable part of the turbine jet is turned upward to keep the upper part of the contactor in motion. On starting, the turbine begins to rotate in the heavy phase present in the lower part of the contactor, and this causes dispersion of the light phase, and the heavy phase acts as continuous phase. This mode of dispersion is expedient when a light phase is desired which is highly pure in the sense of freedom from drops of the heavier phase, after the separation of phases. This succeeds particularly well when the drop phase occurs with compact grouping, that is, the phase proportion Vo/Vaq≦1, whereby also the heavy phase usually separates in rather clear condition.

The invention is in addition described by the aid of the examples following below. Example 2 is a reference example.

EXAMPLE 1

A series of starting tests was carried out with a cylindrical experimental contactor, in which a radial turbine having the design shown in FIG. 3 was placed either in the upper space of a contactor as in FIG. 1 or in the lower space of said contactor as in FIG. 2. The diameter of the experimental contactor used was 144 mm, the height measured from the bottom to the upper baffle being also 144 mm. The radial turbine with diameter 100 mm was in the first instance placed so that the lower margin of the circular plate confining the radial turbine upwards was 2 mm higher than the distributing edge of the guiding distributor ring placed on the cylindrical surface of the contactor. In the latter instance, the top surface of the circular plate confining the radial turbine downwards was 2 mm below the distributing edge of the similarly positioned distributor ring. In the first instance, the distributing edge of the distributor ring was 85 mm and in the latter 32 mm distant from the bottom of the contactor. The distributing edge extended 15 mm out from the cylindrical surface of the contactor, the guiding surfaces of the distributor ring being curved at a circular radius of 15 mm. The apertures in the cylindrical surface of the intake cylinder, in immediate vicinity of the contactor's bottom on opposite sides of the cylinder had been set to diameter 13.5 mm. Below the top baffle, 115 mm from the contactor bottom was placed a circular plate with 70 mm diameter, mounted on a horizontal shaft.

In the mixing tests an aqueous solution was used which contained 100 g/l $Na_2SO_4$ and the pH of which had been acidified with sulphuric acid to 1.0. For the light solution phase, aliphatic kerosene solution was used, to which had been added a quantity of trioctylamine equivalent to 1% by vol. and a quantity of dodecanol equivalent to 1% by vol. The specific gravity of the solution was 0.79 kg/dm$^3$. The contactor was filled up to the top baffle for the tests at room temperature using said solutions in varying proportions. The radial turbine of the contactor was started to rotate at 390 r.p.m., five times after each filling. According to the procedure, the solution phases were allowed to separate completely before the next start. The results given in the enclosed tables reveal that the extraction contactor in the first instance preferred the dispersing of the heavy solution phase (RD state) and in the latter, dispersion of the light phase (KD state).

| Filling proportion of liquid phases | Times of occurrence of different dispersion types | |
|---|---|---|
| | Radial turbine in upper space of contactor | Radial turbine in lower space of contactor |
| 2.80 | 5 RD | 5 RD |
| 2.20 | 5 RD | 2 RD, 3 RD |
| 1.88 | 5 RD | 5 KD |
| 1.40 | 5 RD | 5 KD |
| 1.06 | 5 RD | 5 KD |
| 0.80 | 5 RD | 5 KD |
| 0.60 | 5 RD | 5 KD |
| 0.51 | 5 RD | 5 KD |
| 0.40 | 5 KD | 5 KD |
| 0.33 | 5 KD | 5 KD |

EXAMPLE 2

Reference Example

Reference tests were carried out at room temperature and a cylindrical contactor structure of the same size was used as in Example 1. The radial turbine and shut-off disk structure was also the same as in the preceding example. The radial turbine was mounted in the lower space of the contactor as shown in FIG. 2, with the difference that the circulation apertures 21 of the intake cylinder had been plugged and the distributor and guide rings 18 and 20 mounted on the cylindrical surface of the contactor had been removed. Thus by the changes the conventional pump mixer design has been approximated, in which usually the pumping radial turbine placed in the lower part of the contactor by the primary vortices resulting from the rotation keeps the whole contents of the contactor in dispersed state.

At starting the radial turbine, the contactor had been filled with quantities of the solution phases corresponding to the phase proportion (light/heavy)=1.22, which solution phases had the same composition as those used in Example 1.

In all mixing contacts, 79 ml/min of the heavy phase was supplied through the entrance aperture 3 and 115 ml/min of the light phase through the aperture 4, an equivalent quantity of dispersion departing through the top baffle aperture 12 and the overflow aperture 16. In all experiments, the contactor started with the light phase dispersed, in which state also the dispersion remained throughout all mixing periods. Dispersion samples were taken from the immediate vicinity of the top surface of the shut-off disk, at various times. As the results compiled in the following table indicate, passage of the light phase through the contactor significantly faster than the heavy phase is only avoidable by using an unfavourably high r.p.m. value in rotating the radial turbine.

| Contact time, min. | Phase proportion (light/heavy) of solutions | | | |
|---|---|---|---|---|
| | 260 r.p.m. | 275 r.p.m. | 352 r.p.m. | 372 r.p.m. |
| 0 | 1.22 | 1.22 | 1.22 | 1.22 |
| 10 | 2.00 | 1.58 | 1.27 | 1.25 |
| 20 | 1.21 | 1.03 | 1.22 | 1.23 |
| 30 | 0.84 | 0.75 | 1.12 | 1.20 |
| 40 | 0.60 | 0.69 | 1.09 | 1.15 |
| 50 | 0.42 | 0.54 | 1.00 | 1.15 |
| 60 | 0.35 | 0.51 | 1.00 | 1.17 |
| 70 | 0.37 | 0.51 | 1.04 | 1.12 |
| 80 | 0.39 | 0.49 | 0.96 | 1.16 |
| 90 | 0.37 | 0.49 | 1.02 | 1.11 |

EXAMPLE 3

The experiments presented in the previous example were repeated even further at room temperature, after the contactor structure had been changed to be as in FIG. 1. The radial turbine with guide rings had thus been placed in the upper space of the contactor, as described in Example 1. The two circulation apertures located in the intake cylinder had been enlarged to dimension 15.5 mm.

The contactor started in the r.p.m. range 260–372 every time with the heavy solution phase the dispersed phase, and this dispersion state remained permanent during said test periods. No remarkable phase proportion changes took place in the contactor: the phase proportion (light/heavy) remained over 1 also at the lower end of the r.p.m. range. After the mixing contacts, the solution phases separated from each other, yielding pure, clear solutions.

EXAMPLE 4

The pumping capacity of three different pump turbines was tested, still using the same contactor size and the structure of FIG. 2. Once again, the circulation apertures 21 of the intake cylinder were blocked, and the distributor and guide rings 18 and 20 and the shut-off disk 13 were removed. The pumping capacity was measured with the pump turbines rotating in water at room temperature, the contactor filled to capacity with water without throughgoing flow, the lifting height ($H_{v-o}$) of the turbines at different r.p.m. Values being found directly from the differences in level between the departure and entrance lines of the contactor. All turbines had been mounted at 1 mm distance from the ring plate 23 of the intake cylinder.

Of the turbines in the test, with 100 mm diameter, the model 1 was as in FIG. 3, model 2 was the same turbine, but its entrance guide removed, and model 3 was a design found among those which are conventional, consisting of a circular plate and of six straight, radial vanes mounted thereunder, flush with the circumference of the circular plate, size 30 mm×10 mm. The result that was obtained is seen in the table below.

|        | Lifting height of the turbine (Hv-o) mm water column | | |
|--------|---------|---------|---------|
| R.p.m. | Model 1 | Model 2 | Model 3 |
| 100    | 12      | 12      | 11      |
| 200    | 43      | 40      | 39      |
| 300    | 108     | 91      | 88      |
| 400    | 194     | 172     | 156     |
| 500    | 338     | 293     | 260     |

We claim:

1. A process, for mixing a light liquid phase and a heavy liquid phase in liquid-liquid extraction with each other to produce a good dispersion, comprising maintaining the light phase continuous and dispersing in the heavy phase in the light phase, said continuous light phase having a volume smaller than or at most equal to the volume of the dispersed heavy phase, by causing a substantially vertical circulation flow to take place in the dispersing volume, and including initiating said circulation flow in the said light phase; and wherein the dispersion is circulated in the dispersion volume through several cycles before it is removed from the dispersion volume and the circulating time of the dispersion is shorter than the separating time of the solution phases in the dispersion.

2. A process for mixing a light liquid phase and a heavy liquid phase in liquid-liquid extraction to produce a good dispersion of the heavy phase as droplets while maintaining the light phase continuous even though the light phase has a volume less than or at most equal to the volume of the heavy phase comprising feeding a heavy liquid phase and a light liquid phase into a circulation dispersion contactor so that the light phase is above the heavy phase, causing rotatable pumping means to rotate in the light phase, thereby causing motion of the light phase, which motion disperses the heavy phase as droplets in the ligh phase and continuing rotation of said pumping means to maintain the dispersion of the heavy phase in the light phase while withdrawing the mixed phase from the circulation dispersion contactor.

3. The process of claim 2 and including feeding the heavy and light phases into the contactor from below the contactor to a zone adjacent said pumping means and withdrawing the mixed phases from the contactor above the pumping means.

* * * * *